Oct. 11, 1927.

J. P. TARBOX 1,644,758

BALANCING SYSTEM FOR AIRCRAFT

Filed March 20, 1924    3 Sheets-Sheet 1

Inventor
John P. Tarbox

Patented Oct. 11, 1927.

1,644,758

UNITED STATES PATENT OFFICE.

JOHN P. TARBOX, OF GARDEN CITY, NEW YORK, ASSIGNOR TO TARBOX SAFETY AIR-CRAFT COMPANY, OF WASHINGTON, DISTRICT OF COLUMBIA, A COMPANY ORGANIZED UNDER THE LAWS OF DELAWARE.

BALANCING SYSTEM FOR AIRCRAFT.

Application filed March 20, 1924. Serial No. 700,508.

My invention relates particularly to lateral balancing systems for aircraft, but while of that particular relation may also have some adaptation to the longitudinal balance of aircraft and directional steering. Still more particularly the invention relates to those lateral balancing systems employing differential self-acting lateral balance control surfaces of the type disclosed.

Referring to the drawings.

Figure 5:
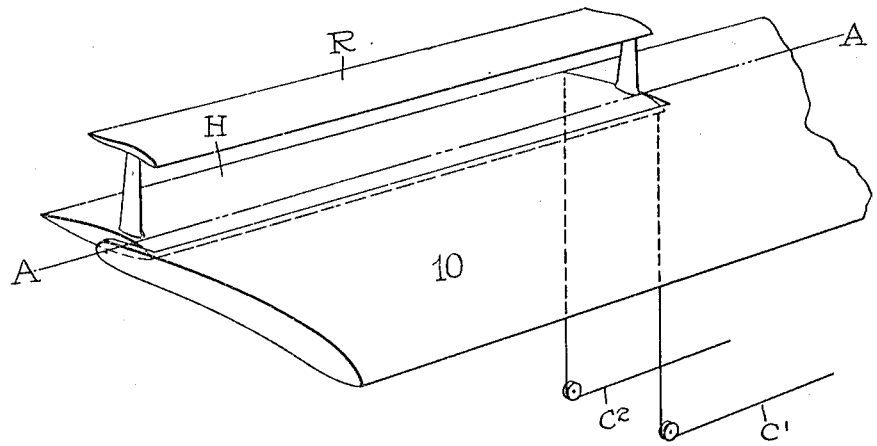

Fig. 5 a perspective of still a third modification.

Figure 1:
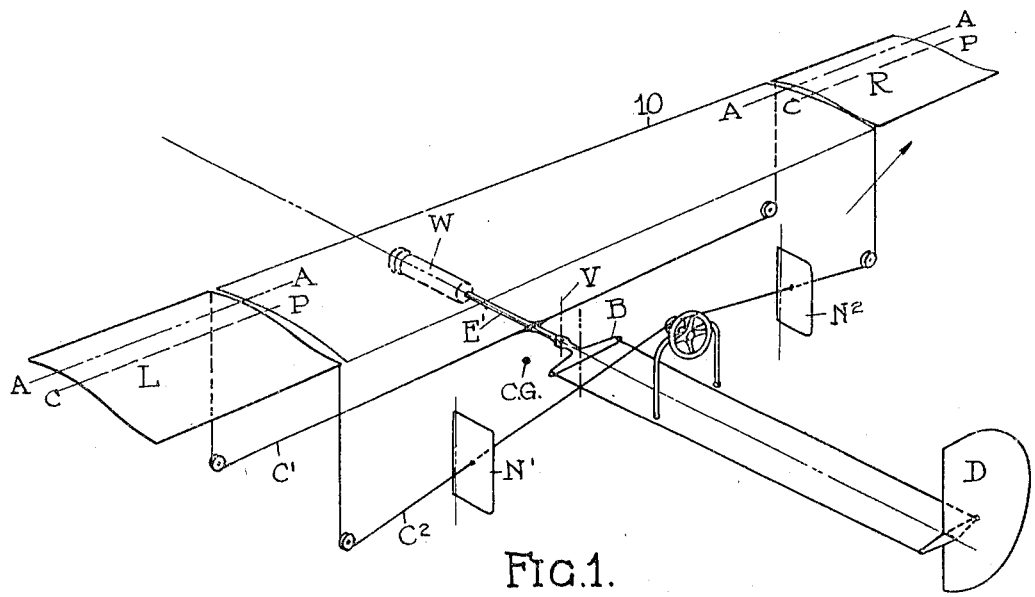
Fig. 1 is a diagrammatic perspective of the system.

Referring first to Fig. 1. The dotted surface 10 represents diagrammatically the principal supporting surface of the aeroplane. As lateral extensions of this surface are right and left ailerons R, L, respectively. The ailerons are mounted on axes AA related fixedly to the principal supporting surface 10 in any suitable structural manner. From this standpoint ailerons R, L need not necessarily be in lateral extension of the principal supporting surface 10 but may bear any positional relation thereto compatible with convenient location of the axes. Thus they might be located between biplane wings. The relation is not essential, tho important.

Ailerons R, L are interconnected by a continuous cable $C^1$, $C^2$ or its equivalent to partake of movement in opposite directions when the cable is moved. Normally the ailerons are set at an angle in which they lift substantially and to this extent are part and parcel of the aggregate lifting surface of the aeroplane. So set, when moved oppositely, they are also moved differentially in an aero-dynamic sense, the lift of one being increased while the lift of the other is decreased.

Figure 2:
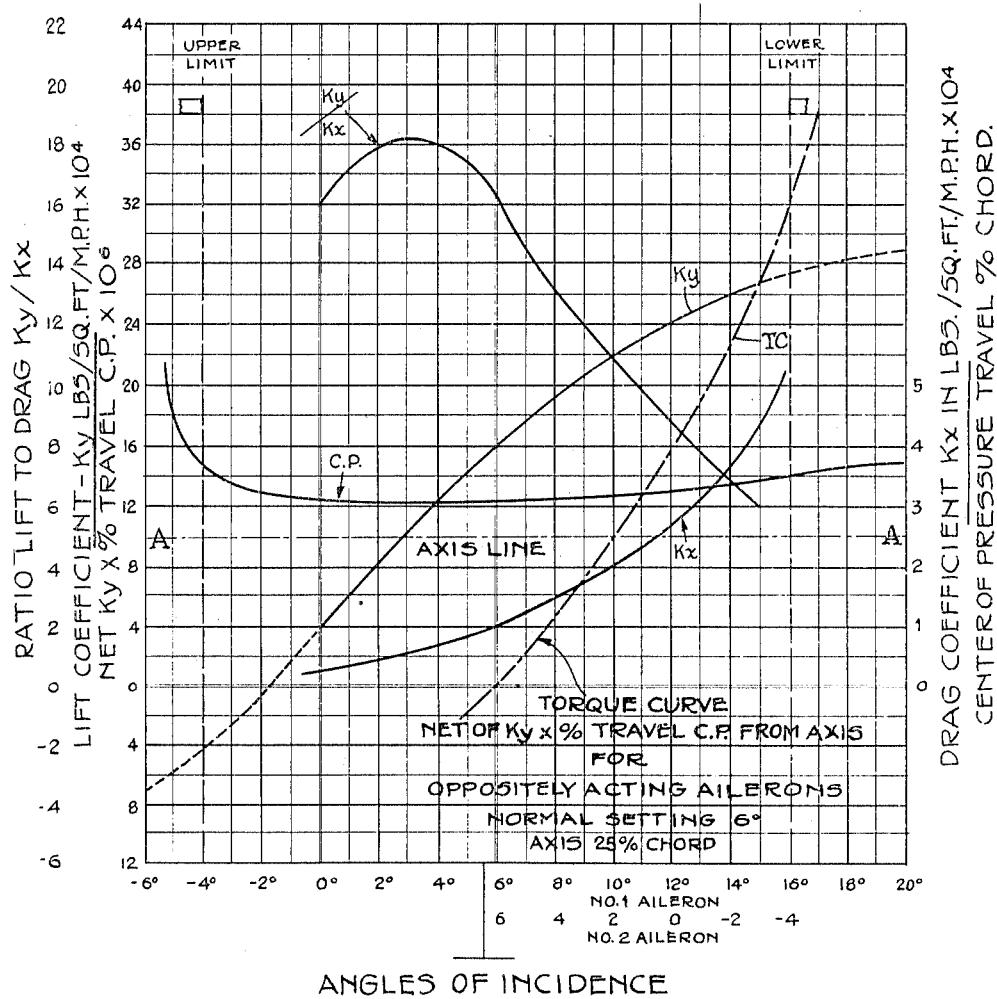
Fig. 2 is sheet of graphs illustrating the characteristics of the control surfaces employed.

In Fig. 2, I have disclosed the characteristics which I embody in these ailerons. These are, of course, to be taken as illustrative of the general characteristics which I give the ailerons of the system. These graphs show the lift $K^y$, the drift $K^x$, the ratio of lift to drift $K^y / K^x$, and the center of pressure travel CP, characteristics of an aerofoil section known as Eiffel #32. With this section when the axes AA of the ailerons are located on a line 25 per cent of the chord from the leading edge, being related to the center of pressure travel of the aerofoil in the manner shown in the graph by the dash and dot line marked AA, the net torque of ailerons R, L about their axes AA, progressively, regularly and uniformly increases. This is shown on the graphs by the torque curve labeled TC which is plotted as the net of the lift coefficient $K^y$ multiplied by the percent travel of the center of pressure of the aerofoil CP from the axis line AA, a factor proportional to actual axial torque. It is also proportional to the pitching moment about AA. The ailerons are assumed to have been set in a normal position of 6°, but it is equally true of other normal settings, for example 1½°, 4½° etc., within a determinate range.

The net torque is the algebraic difference between the torque of the aileron whose incidence is increased and that of the aileron whose incidence is decreased. Thus for example, when the incidence of one aileron is increased 2° from 6° to 8° and that of the other is differentially decreased from 6° to 4°, the net torque expressed in the units selected is indicated by curve TC to be about 4.33. It will be noted that curve TC is a very smooth curve, the increase being not only regular but so uniform that the curve approximates a straight line.

A number of aerofoil sections markedly showing these general characteristics exist at the present time and others will be devised as the art progresses.

Preferably within the body of the aeroplane is a lever $E^1$ pivoted on a vertical axis V carried on a forward extension of the rudder bar B, and extended forwardly beyond the vertical line or vertical transverse plane passing thru the center of gravity CG. At or near its forward end this lever carries an adjustable weight W which is located as far forward of the center of gravity CG as convenient space will permit. Lever E is connected with branch $C^2$ of the differential cable $C^1$ $C^2$ at a point between weight W and axis V.

Connected with branch $C^2$ of the cable are a pair of vanes $N^1$, $N^2$, one to the left and one to the right. These vanes are supported on vertical axes in such manner that when subjected to side pressure they operate to tend to pull cable $C^2$ in a direction to increase the incidence of the aileron R or L which lies on the side of the aeroplane from which the side pressure comes. Vanes $N^1$, $N^2$ lie aft of the transverse plane passing thru the center of gravity CG. They may be conveniently hinged to any of the rear struts, as for example, the rear intermediate struts of a biplane or multi-plane, supported on some independent axes in a monoplane, singly or combined, or located at any other convenient point.

Cable $C^2$ also connects with manual control wheel of a control mechanism of the Deperdussin type.

The craft is provided with the usual vertical rudder D and an elevator (not shown).

The operation is as follows:

Assume craft to be flying straight ahead and the right hand aileron R to be struck by an up gust having a general direction of the arrow applied to Fig. 1. Aileron R gives before it and the initial impact of the gust on the aeroplane is in this manner and to the extent of its engagement with aileron R, shock absorbed. In this act of shock absorption, however, the work done by the gust is not wasted as is the work of road impacts upon the shock absorbers in common use on automobiles, but is usefully applied. Thru differential cable $C^1$, $C^2$, aileron L is simultaneously moved to increase its angle of incidence, increase the lift on that side of the machine and thus set up an effective counteractive torque.

So upon its initial impact and before the aeroplane at large, which is of relatively greater inertia than the balancing system, has moved substantially from its normal attitude, the gust has been definitely opposed first thru the act of partial shock absorption by aileron R, and second thru the concurrent counteractive torque on aileron L. The effect of the gust upon the aeroplane is anticipated and corrected for in advance as far as may be. As a result, when the aeroplane does roll, as it must except the gust be a light and fleeting one, the roll is materially less than it would have been had this advance action not taken place.

When the craft now begins to roll, three additional forces are immediately set up. First, gravity acts on weight W tending to move it toward the low side; second, the aeroplane itself tends to accelerate laterally in minor or major degree toward the low side; and third, the vanes $N^1$, $N^2$ are subjected to side pressure in combined proportion to such acceleration and any veering which may take place either as a result of such acceleration or difference in drag between opposite sides of the machine, or both of these factors together. But, gravity and side pressure act thru the weight and vanes respectively upon cable $C^1$, $C^2$ in conjunction, which is to say, they tend to move the ailerons R, L in the same direction and this direction is that which increases the incidence of aileron L on the low left side of the machine (still assuming the gust shown in Fig. 1). Together the gravity and side pressure forces are greater than any other force set up in the system by virtue of lateral acceleration of the aeroplane at large. Barring friction the gravity acceleration of W will always exceed that of the aeroplane at large, because the large vertical surfaces of the aeroplane retard it. Thus when roll ensues the advance movement of the ailerons just described is supplemented now by a further movement proportional to the degree of roll. If we may say that the advance setting of the ailerons is proportional to the force factor of the gust as represented by its initial impact, and that the degree of roll is proportional also to the extent, distance, and time factors of the gust, we may now say that the ailerons are set in positions representing a corrective torque proportional to the entire work of the gust.

When the gust passes, the ailerons are immediately let off by the amount moved by the differential airrush, but are held on to the extent moved by the weight and vanes until the machine starts back to normal, and the setting is progressively relieved as it approaches normal.

The operation is the same in case any other kind of gust strikes the aeroplane irrespective of direction or velocity. In case of unbalance due to shift of load rather than wind gusts, however, the initial movement of the ailerons is effected thru weight W and vanes $N^1$, $N^2$.

Thus it will appear that the system embodies in order of predominance three elements of control; first, the airrush itself acting upon the normally lifting control surfaces R and L or their equivalent; second, gravity acting upon the horizontally swinging weight W or its equivalent; and third, side pressure acting upon vanes $N^1$, $N^2$ or their equivalent. In other words, the magnitude of the torque developed by the last named controlling force is less in degree than that developed by the second, and that developed by the second in turn is less in degree than that developed by the first. The correctness of this relation will be easily apprehended when it is considered that change in airrush conditions is the root cause of most unbalancing. In making it predominant we strike that cause at its root. As weight W normally swings in a horizontal plane it does not in any way interfere with that predominance except to the extent of its inertia of movement, and therefore the initial shock absorbing and counteracting action of the ailerons under the impact of the gust is not interferred with by gravity, nor by the subordinated vanes $N^1$, $N^2$. The initial response of the system, is therefore, very quick and very full.

Because extreme gusts should be counteracted at their inception as far as may be, it is provided that the gust torque on a given aileron may move the system to its extreme limit. Suitable limit stops are provided to define this. (See Fig. 2). Because the gust torque may so move the system, and because it always moves or tends to move the system to some extent at least before roll sets in, the gravity torque of W is used in supplementation merely, and sufficiently to be effective after the gust has passed to insure prompt return of the craft to normal position.

The vanes $N^1$, $N^2$ are but required to overcome friction and accelerate the system in the right direction under side pressure, and to assist the ailerons in damping its movement. The weather vane action by which it assists the ailerons in centering the system and establishing a determinate normal for weight W must be overcome both by weight W and the ailerons under gust torque. Obviously vanes $N^1$, $N^2$ develop a subordinated torque.

The action of turning is simple. One merely operates the foot bar F in the usual manner. This operation thru connection V gives the ailerons an initial movement to initiate a bank, and swings the aeroplane bodily about its vertical axis so that the airrush is from a quarter. Such progress of the airplane is called skidding, and is really lateral acceleration. This swinging by virtue of the inertia of weight W ahead of the CG and the fan action of vanes $N^1$, $N^2$ behind the CG increase the initial movement of the ailerons. Such swinging of the aeroplane, however, is but momentary. Immediately, due to the vertical surfaces of the aeroplane at large plus the initiated bank, the craft commences to turn about an imaginary point in space. The moment it commences to turn centrifugal force acts upon weight W. This centrifugal force conjoined with the force of the quartering airrush on vanes $N^1$ $N^2$ due to the lateral acceleration operates to swing weight W outwardly to increase the already greater incidence of the aileron on the outer side of the aeroplane and correspondingly decrease the incidence on the inner side of the aeroplane to further bank the craft. As the craft comes up into a bank the turning action is accentuated and the relative wind returns quickly toward the head, cutting down the force exerted by vanes $N^1$, $N^2$, while the centrifugal force is for the moment accentuated raising the force on weight W. As the areoplane banks up, however, gravity comes into play tending to carry weight W back to its normal position, and this it does do as the craft pulls up into steady flight at the proper bank. At this point the rudder is released to a degree compatible with the flying characteristics of the aeroplane and may be taken off altogether, should the aeroplane hold its turn without it. Thereafter the aeroplane behaves in bank precisely as it does on straight-away flight responding to gusts in the same manner. To come out of the turn, one has but to apply reversed rudder. Centrifugal force is at once abated. Gravity and whatever slight side slip (or lateral acceleration toward the low side) there is apply the aileron on the low side and the ship is progressively relieved of its bank.

By virtue of the characteristics given ailerons R, L set forth in Fig. 2, whenever they respond to an air gust that response is not only prompt but very accurately proportional to the force of the gust. This cannot be otherwise when the curve of net torque of ailerons R, L is formed as set forth. The proportion is the more exact the more uniform the pitching moment curve of the section. Moreover, the supplemental movement of the ailerons when the aeroplane rolls is most accurately proportional to the supplementing forces of gravity and side pressure as imposed thru weight W and vanes N. The torque of gravity as developed thru weight W in cable C is progressively, regularly, and substantially uniformly developed along a sin cos curve which approximates very closely that curve of net torque of the ailerons outlined in Fig. 2. Thus each degree of roll bringing about an increased movement of weight W and an increased gravity torque in cable $C^1$, $C^2$, finds a complemental opposition developed by the net torque of the ailerons in the same cable. The action is resultingly not only most accurate but highly "dead-beat".

But a yet greater advantage results from this combination. Differentially acting ailerons whose net torques progressively increase in the manner specified, regularly or uniformly as the case may be, are effective thru a much greater range of flying angles than those which do not possess these characteristics. In fact they are effective throughout the entire range of flying angles of any aeroplane upon which the system is installed. By effective is meant the capability of developing adequate corrective torque to preserve lateral balance. In other words, irrespective of the incidence of the main supporting surface the aileron action is sufficient to maintain lateral balance. It is peculiar to my invention that the aileron section and area provided shall have a range of effectiveness encompass the range of flying angles of the aeroplane.

Besides affording accuracy and sufficiency of control, this system also affords the very greatest ease of control when functioning either manually or automatically. So far we have assumed only automatic control. Under automatic control the wheel of the control mechanism is revolved back and forth freely by the movement of the cable over the drum. Elevating control during this period is by means of an auxiliary hand grip G. At any moment the manual control may be assumed by merely shifting one's hand from grip G to the wheel H. This constantly available manual control is one of the advantages of this system. In launching or landing, or in any close space, or at any other time it is desired to execute an unusual maneuver, manual control may be undertaken merely by grasping the wheel. There are no auxiliary levers, clutches, or like supplementary appurtenances which have to be preliminarily manipulated.

Obviously any unnecessary load that can be taken off the wheel will relieve the pilot of effort when he is using manual control and increases ease of manual control of the craft. Friction is one of the greatest drawbacks in any system. In this system this is overcome in part by using anti-friction bearings and direct cable connections throughout. The system especially lends itself to direct cable connections. Further the vanes $N^1$, $N^2$ acted upon by side pressure overcome what remains of friction, importantly in gradually developed minor acceleration of the aeroplane at large, during which friction if great enough tends to preclude acceleration of W in response to the force of gravity. So vanes $N^1$, $N^2$ are made of the largest practicable area consistent with the predominance of weight W or ailerons R and L, as the case may be. In other words, they are made just as large as it is possible to make them without permitting them when deflected to unduly oppose the aileron movement resulting from either airrush or gravity force, for vanes $N^1$, $N^2$, as hereinbefore set forth, also act to damp this system by virtue of their wind vane action. Thereby they assist ailerons R and L in preserving the "dead-beat" operation.

The aggregate amount of friction in a system, however, also depends upon the magnitude of the forces which its relatively moving parts bear. Ease of manipulation is also dependent directly upon the magnitude of the forces in the system. It is part of my invention to reduce the magnitude of these forces to a minimum. This I accomplish by a further embodiment of the characteristics outlined in Fig. 2. The net torque curve of the characteristics of the curve TC set forth can be derived from the same aerofoil section with a number of its relations of the axis line AA to the center of pressure travel CP. The net torque for a given angular movement is the smaller the nearer the axis line to the line of center of pressure travel, for the simple reason that the effective lever arm of the airrush forces is smaller. In other words, the pitching moments are smaller and net torque, which is but the difference between the pitching moments of R and L, must be smaller. The net torque being smaller the magnitude of the forces introduced by the play of that torque in the system at large must be smaller.

My invention contemplates deriving the net torque thru a location of the aileron axes as near to the point of extreme forward travel of the center of pressure as is consistent with the deriving of sufficient torque, (a) to overcome friction, (b) to overcome inertia, (c) to overcome the damping action of vanes $N^1$, $N^2$, and (d) to secure that rapidity of response which the relatively high speed of action of gusts requires for prompt and full counteraction. This last named requisite is dependent in a large measure upon the overcoming of inertia, inasmuch as acceleration is directly dependent upon it. These factors vary of course but nevertheless bear a fairly definite relation to the size of the aeroplane. The amount of aileron surface required in machines of average speed, say from 80 to 125 miles per hour, averages about 12½ percent, and the weight per square foot of such surfaces is substantially a fixed minimum in good design. The aggregate opposing torques of all these factors together, however, is relatively small as compared with the total net torque which can be developed thru the ailerons themselves, being only a few percent. Thus I may reduce this phase of my invention to geometrical terms by stating that it consists in the location of the axes of the ailerons in the region of that end of the range of axes locations within which a net torque curve of the form shown in Fig. 2 can be developed, which end lies toward the trailing edge of the aerofoil. In the embodiment illustrated this range may be said to be about 27 percent of the chord from the leading edge. The axis line is located at 25 percent of the chord. If it were located at 27 percent of the chord insufficient net torque would be developed to meet the ends of my invention. If it were located at 28 percent of the chord there would not be developed the net torque curve of the characteristics of my invention, the 28 percent point lying outside of the range. On the other hand, if it were located at 10 percent of the chord or 5 percent of the chord, the magnitude of the forces generated in the system would be extremely great and the ends of this phase of my invention would be defeated. Location at a point between 20 and 25 percent of the chord is found to give excellent results in the case of the section illustrated.

By this invention I not only reduce the friction and enhance the ease of control, but also very greatly reduce the necessary mass of the weight W and the size of the vanes $N^1$, $N^2$, and thus save a great deal of weight. Since by keeping the magnitude of the airrush torques at this prescribed minimum, the torques of gravity and the side pressure torques required to co-act with them, are correspondingly smaller. Yet in attaining these ends accuracy of response of the system, "dead-beat" action, range of effective control, and sufficiency of control, have in nowise been sacrificed since other characteristics of the system remain the same.

The system is extremely adaptable. It may be applied to existing aeroplanes without substantial alteration, merely by removing the usual ailerons and mounting the ailerons prescribed by these inventions. They may be used conveniently in place of the usual overhang. They are applicable to all types of planes. Embodied in new aeroplanes the additional expense is inconsequential. The usual control mechanisms are not changed. The usual interconnecting cables are used. The weight moving as it does in a horizontal plane may be mounted beneath a false floor in any cockpit. There are many suitable locations for relatively small vanes $N^1$, $N^2$.

Figure 3:
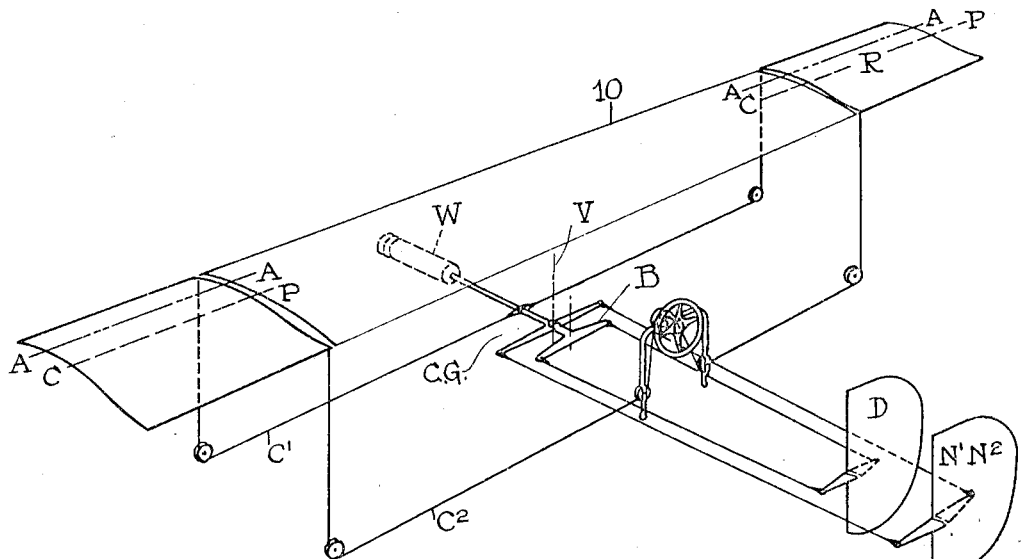
Fig. 3 is a diagrammatic perspective of a modification of the system.

The system is likewise capable of many modifications. In Fig. 3, I show one of these. Note firstly that vanes $N^1$, and $N^2$ are consolidated and placed on the tail of the machine with the rudders. Note secondly, that this vane is directly connected with the lever $E^1$ in such manner as to be operated from that lever instead of from the branch $C^1$, $C^2$ of the cable. As before, the weight W is located in advance of the center of gravity of the machine and by reason of its location on the tail the vane surface $N^1$, $N^2$ is well aft of the CG. Like the system of Fig. 1 the rudder bar may or may not carry the pivot of the lever E, so that when a turn is attempted there may or may not be initial banking of the machine due to movement of the ailerons directly from movement of the rudder bar. Movement of the ailerons to bank the craft is enhanced by virtue jointly of the fact that weight W is located forward of the center of gravity and vane N is located so very far aft. This follows from the fact that the initial movement of the craft in response to operation of the rudder bar is to move around its center of gravity. In such movement the inertia of weight W causes it to lag behind, and such movement itself generates a side pressure on $N^1$, $N^2$, which side pressure is the greater because of the greater resultant velocity of the airrush incident to the location of $N^1$, $N^2$ so far removed from the axis of rotation of the aeroplane. Still further when located on the tail of the craft surface $N^1$, $N^2$ acts as a rudder would act to counteract differences in drag occasioned by differential movement of the ailerons. Thus when ailerons R is lowered and aileron L is raised there is a greater drag on the side of aileron R. This is counteracted by the coordinate movement imposed by $N^1$, $N^2$. Thus too, when the rudder bar carries lever E, there is a momentary let off when making a turn which gives the machine time to bank up without substantial skidding.

Figure 4:
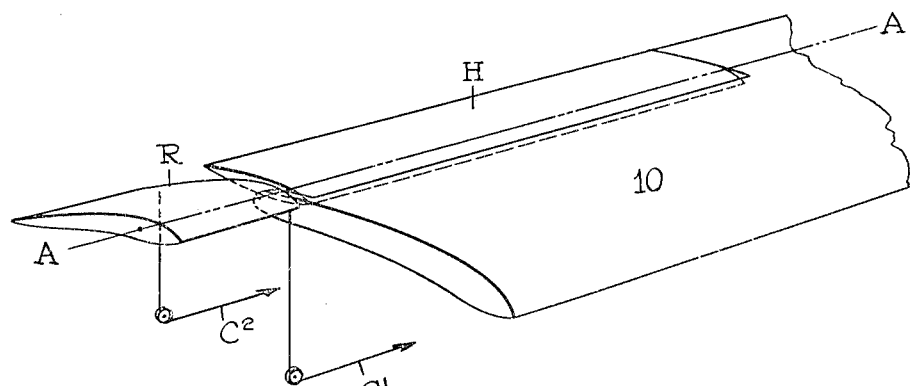
Fig. 4 is a perspective of a further modification.

In Fig. 4 is shown an application to ailerons of the usual type. Aileron 11 in Fig. 4 is a trailing edge aileron of the Handley-Page type which is intended to be substantially fully balanced aero-dynamically along its own axis. Connected to that axis, or directly to the balanced aileron, and projecting from the end of the machine, is a controlling aileron R having the section, axis location, and other characteristics of the ailerons R and L, of my invention. Such controlling aileron need be relatively small as compared with ailerons R and L in the system of Figs. 1 and 3, since it need not develop so great corrective torque of itself. Cables $C^1$ and $C^2$ are connected to a weight W and vane surface $N^1$, $N^2$ and the control mechanisms as in the case of Figs. 1 and 3.

In Fig. 5 is shown an application thru a combination of the Handley-Page balanced type of aileron and the German superposed balancing plane. As in case of Fig. 4, I propose that the trailing edge aileron be perfectly balanced aero-dynamically. The superposed surface, however, connected with the balanced ailerons by suitable horns, will be given the characteristics of the ailerons R and L, of Figs. 1 and 3, so that they will be the controlling elements of the system. The cable connections are intended to be the same.

Any type of aileron whatsoever may be used.

The system may be utilized in the form of pilot controls to govern any of the usual types of ailerons thru appropriate servo-motors or equivalent modifications. When so used inertia and friction may be reduced to a veritable minimum, and promptness, fullness and accuracy of response realized to the full. For very large machines the servo-motor system may be preferred to the direct acting system despite the added complication occasioned by the servo-motor itself. And there are yet other modifications, In the annexed claims I aim to define my invention as applied thru any and all embodiments in its generic spirit.

What is claimed is:

1. An aircraft comprising a main supporting member which constitutes the lifting body of the craft, a balancing device upon each side of said main supporting member and presenting co-operating surfaces arranged to be normally continuously acted upon in flight by air pressure to produce torques in opposite directions about the longitudinal axis of the craft, said balancing devices being connected to each other and each responsive to temporarily preponderating pressure thereon to increase the torque of the other, and a vane connected with said balancing devices and acted upon by the air rush when the aeroplane develops lateral acceleration to move the balancing devices in a direction to decrease the lateral acceleration.

2. An aircraft comprising a main supporting member which constitutes the lifting body of the craft, a balancing device upon each side of said main supporting member and presenting co-operating surfaces arranged to be normally continuously acted upon in flight by air pressure to produce torques in opposite directions about the longitudinal axis of the craft, said balancing devices being connected to each other and each responsive to temporarily preponderating pressure thereon to increase the torque of the other, and a vane, the body of which is located aft of the center of gravity of the aircraft, connected with said balancing devices and acted upon by the air rush when the craft develops lateral acceleration to move said balancing devices in a direction to counteract said lateral acceleration.

3. An aircraft comprising a main supporting member which constitutes the lifting body of the craft, a balancing device upon each side of said main supporting member and presenting co-operating surfaces arranged to be normally continuously acted upon in flight by air pressure, to produce torques in opposite directions about the longitudinal axis of the craft, said balancing devices being connected to each other and each responsive to temporarily preponderating pressure thereon to increase the torque of the other, but acted upon through gravity when the craft is unbalanced to further increase the torque, together with a vane connected with said balancing devices and acted upon by the air rush when the aeroplane developes lateral acceleration in a direction to move said devices to counteract said development.

4. An aircraft comprising a main supporting member which constitutes the lifting body of the craft, a balancing device upon each side of said main supporting member and presenting co-operating surfaces arranged to be normally acted upon in flight by air pressure, to produce torques in opposite directions about the longitudinal axis of the craft, said balancing devices being connected to each other and each responsive to temporarily preponderating pressure thereon to increase the torque of the other, and a weight located in advance of the vertical axis of rotation of said craft, connected with said balancing devices and acted upon by gravity when the craft is unbalanced to tend to move the balancing devices in a direction to decrease the degree of unbalancing.

5. An aircraft comprising a main supporting member which constitutes the lifting body of the craft, a balancing device upon each side of said main supporting member and presenting co-operating surfaces arranged to be normally acted upon in flight by air pressure to produce torques in opposite directions about the longitudinal axis of the craft, said balancing devices being connected to each other and each responsive to temporarily preponderating pressure thereon to increase the torque of the other, and a weight located in advance of the vertical axis of rotation of said craft, connected with said balancing devices and acted upon by gravity when the craft is unbalanced to tend to move the balancing devices in a direction to decrease the degree of unbalancing, and a vane, the body of which is located aft of the center of gravity of the craft, connected with said balancing devices and acted upon by the air rush when the craft develops lateral acceleration to move said balancing devices in a direction to counteract said lateral acceleration.

6. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation.

7. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation and irrespective of the location of the pivotal axes with respect to the forward travel of the center of pressure of the section within a determinate range.

8. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively and uniformly increases when they are displaced from their normal positions of equal incidence, throughout their required range of effective operation.

9. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation and irrespective of the location of the pivotal axes with respect to the forward travel of the center of pressure of the section within a determinate range, and transverse pivotal axes for said surfaces located within and in the vicinity of the rear end of said range.

10. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation, and a standard of position with respect to earth connected to said balancing devices both to actuate and be actuated by the same.

11. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation, and a standard of position with respect to earth connected to said balancing devices both to actuate and be actuated by the same, which standard develops a progressively increasing gravity torque as the craft rolls, throughout the required range of effective operation of said balancing surfaces.

12. A balancing system for aircraft comprising a pair of transversely pivoted and interconnected areo-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation, and a horizontally swinging pendulum connected with said balancing devices both to actuate and be actuated by the same.

13. A balancing system for aircraft comprising a pair of transversely pivoted and interconnected aero-dynamically differential self-acting lateral balancing surfaces, one on each side of the plane of symmetry and having normally equal and substantial angles of incidence, said balancing surfaces being of such aerofoil section that their net torque about their transverse pivotal axes progressively increases when they are displaced from their normal positions of equal incidence, throughout their required range of effective operation, and a standard of position with respect to earth, and a vertically pivoted vane subject to side pressure both connected to said balancing devices to actuate and to be actuated by the same.

14. A balancing system for air craft comprising a pair of transversely pivoted and interconnected aero-dynamically differential self-acting lateral balancing surfaces, one on each side of the plane of symmetry and having normally equal and substantial angles of incidence, said balancing surfaces being of such areofoil section that their net torque about their transverse pivotal axes increases progressively when they are displaced from normal positions of equal incidence throughout the required range of effective operation irrespective of the normal incidence as imposed by the adjustment of the flying angles of the craft.

15. In an aircraft, a pair of transversely pivoted and interconnected aero-dynamically differential self-acting lateral balancing surfaces, one on each side of the plane of symmetry and having normally equal and substantial angles of incidence, of an aerofoil section developing a progressively increasing net torque about their transverse pivotal axes when displaced from normal positions of equal incidence throughout a range of such positions at least equal to the range of flying angles of the airplane.

16. In an aircraft, a lateral balancing surface mounted on a transversely extending pivotal axis and having a normal positive and substantial angle of incidence having torque about its transverse pivotal axis increasing regularly over a determinate range of removal of its pivotal axes forward from the position of extreme forward travel of the center of pressure, and a transverse pivotal axis for said surface within and nearer the after than the forward end of said range.

17. A lateral balancing system for aircraft comprising a pair of interconnected aero-dynamically differential ailerons, one on each side of the plane of symmetry and having normally equal and substantial angles of incidence developing a differential and progressively increasing net air rush torque about their axes, a weight arranged to shift when the craft rolls and connected to actuate and be actuated by the ailerons and developing a gravity torque when the craft rolls, and a vertically disposed vane responsive to side air rush and connected to actuate and be actuated by said ailerons and developing a side pressure air rush torque, the relative magnitude of the maximums of said torques being as follows: that of the vane being sufficient merely to overcome friction and inertia and to precess the system at large to movement in the proper direction, that of the weight being sufficient to overcome friction, inertia, and the vane torque, and to operate the ailerons against normally developed air rush torque a degree less than their full degree, and that of the ailerons under gusts being sufficient not only to overcome friction, inertia and the vane torque, but also to deflect the ailerons to their fullest extent.

18. A lateral balancing system for aircraft comprising a pair of interconnected aero-dynamically differential ailerons, one on each side of the plane of symmetry and having normally equal and substantial angles of incidence developing a differential and progressively increasing net torque about their axes, and a weight arranged to shift when the craft rolls and connected to actuate and be actuated by said ailerons and developing a gravity torque when the craft rolls, the relative magnitude of the maximums of said torques being as follows: that of the weight being sufficient to overcome the friction and inertia of the system at large, and also move the ailerons against their net torque a degree less than the full extent, and that of the ailerons being sufficient not only to overcome the friction and inertia of the system at large but also to deflect the system to its fullest extent.

19. A lateral balancing system for aircraft comprising a pair of interconnected aero-dynamically differential ailerons, one on each side of the plane of symmetry and having normally equal and substantial angles of incidence developing a differential and progressively increasing net torque about their axes, a weight arranged to shift when the craft rolls and actuating and actuated by said ailerons and developing gravity and centrifugal force torques, and a vertically disposed vane mounted to be shifted by side air rush, also connected to actuate and be actuated by said ailerons and developing damping and side pressure torques, the relative magnitude of the maximums of said torques being as follows: those of the ailerons predominant, those of the weight subordinate thereto, and those of the vane in turn subordinate to those of the weight.

20. A lateral balancing system for aircraft comprising a pair of interconnected aero-dynamically differential ailerons, one on each side of the plane of symmetry and having normally equal and substantial angles of incidence developing a differential and progressively increasing net torque about their axes, a weight arranged to shift when the craft rolls and actuating and actuated by said ailerons and developing gravity and centrifugal force torques, and a vertically disposed vane mounted to be shifted by side air rush, also connected to actuate and be actuated by said ailerons and developing damping and side pressure torques, the relative magnitude of the maximums of said torques being as follows: those of the air rush torque being sufficient to overcome the friction and inertia of the system at large, to overcome the vane torque and additionally to attain full deflection of the system, those of the weight acting in conjunction with those of the ailerons but while sufficient to overcome the inertia and friction of the system at large insufficient to carry the aileron and vane to full deflection, and those of the vane sufficient to overcome friction and inertia but sufficient to move said ailerons to a less degree than said weight.

In testimony whereof I hereunto affix my signature.

JOHN P. TARBOX.